United States Patent
Dong et al.

(10) Patent No.: US 11,177,707 B2
(45) Date of Patent: Nov. 16, 2021

(54) MOTOR ROTOR AND PERMANENT MAGNET MOTOR

(71) Applicant: GREE ELECTRIC APPLIANCES, INC. OF ZHUHAI, Zhuhai (CN)

(72) Inventors: Mingzhu Dong, Zhuhai (CN); Yusheng Hu, Zhuhai (CN); Bin Chen, Zhuhai (CN); Bo Zhou, Zhuhai (CN); Min Wang, Zhuhai (CN)

(73) Assignee: GREE ELECTRIC APPLIANCES, INC. OF ZHUHAI, Zhuhai (CN)

(*) Notice: Subject to any disclaimer, the term of this patent is extended or adjusted under 35 U.S.C. 154(b) by 24 days.

(21) Appl. No.: 16/755,115

(22) PCT Filed: Oct. 29, 2018

(86) PCT No.: PCT/CN2018/112310
§ 371 (c)(1),
(2) Date: Apr. 9, 2020

(87) PCT Pub. No.: WO2019/119971
PCT Pub. Date: Jun. 27, 2019

(65) Prior Publication Data
US 2021/0135522 A1 May 6, 2021

(30) Foreign Application Priority Data
Dec. 21, 2017 (CN) .......................... 201711388505.X (51) Int. Cl.
*H02K 1/27* (2006.01)
(52) U.S. Cl.
CPC ....... *H02K 1/2773* (2013.01); *H02K 2213/03* (2013.01)
(58) Field of Classification Search
CPC .... H02K 1/2773; H02K 2213/03; H02K 1/02; H02K 1/276–1/2766
See application file for complete search history.

(56) References Cited

U.S. PATENT DOCUMENTS

| 9,634,528 | B2* | 4/2017 | Zhang | ...................... H02K 1/02 |
| 2009/0236923 | A1* | 9/2009 | Sakai | ................... H02K 1/2766 310/156.43 |
| 2011/0278967 | A1 | 11/2011 | Utaka | |

FOREIGN PATENT DOCUMENTS

| CN | 103219814 A | 7/2013 |
| CN | 103956843 A | 7/2014 |

(Continued)

OTHER PUBLICATIONS

International Search Report of PCT/CN2018/112310.
Written Opinion of PCT/CN2018/112310.

*Primary Examiner* — Thomas Truong
(74) *Attorney, Agent, or Firm* — Dragon Sun Law Firm, PC; Jinggao Li, Esq.

(57) ABSTRACT

The present disclosure discloses a motor rotor and a permanent magnet motor. The motor rotor includes a rotor core and a plurality of magnetic poles in the rotor core. The magnetic pole includes a first, a second, and a third permanent magnets, and the size relationship of the first, the second and the third permanent magnets in the cross section of the rotor core meets $m/2 > H1*Hcj1*L1/[(H2*Hcj2*L2 + \frac{1}{2}H3*Hcj2*L3)] > m/10$, wherein m is a multiple of the motor flux adjustment range; L1 is the length of the first permanent magnet; H1 is the width of the first permanent magnet; Hcj1 is the intrinsic coercivity of the first permanent magnet; L2, H2 and Hcj2 are the length, the width and the intrinsic coercivity of the second permanent magnet, respectively; L3 H3, Hcj3 are the length, the width, and the intrinsic coercivity of the third permanent magnet, respectively.

20 Claims, 4 Drawing Sheets

(56) References Cited

FOREIGN PATENT DOCUMENTS

| CN | 107294243 A | 10/2017 |
| CN | 107994702 A | 5/2018 |
| CN | 207782524 U | 8/2018 |

\* cited by examiner

MOTOR ROTOR AND PERMANENT MAGNET MOTOR

CROSS-REFERENCE TO RELATED APPLICATIONS

This application is a national stage application of PCT Application No. PCT/CN2018/112310. This application claims priorities from PCT Application No. PCT/CN2018/112310, filed Oct. 29, 2018, and CN Application No. 201711388505.X, filed Dec. 21, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure belongs to the technical field of motors, and more particularly relates to a motor rotor and a permanent magnet motor.

BACKGROUND ART

Magnetic flux is supplied to a traditional permanent magnet motor by a permanent magnet. However, the permanent magnet provides a fixed magnetic field, which makes an internal magnetic field of the motor hard to adjust. As a result, it is difficult for the permanent magnet motor to achieve both high-frequency efficiency and low-frequency efficiency. Furthermore, in the case of a fixed voltage of a power supply, the maximum operating frequency of the motor is limited. At present, most permanent magnet motors can only expand the operating range through flux weakening control. When the motor is in flux intensifying control, the operating efficiency of the motor can be lowered.

Therefore, a heretofore unaddressed need exists in the art to address the aforementioned deficiencies and inadequacies.

SUMMARY OF THE INVENTION

Therefore, the present disclosure provides a motor rotor and a permanent magnet motor to solve the technical problems, which can effectively lower the magnetizing and demagnetizing difficulty, increase the motor flux adjustment range and improve the operating efficiency of a motor during flux intensifying control.

In order to solve the above problems, the present disclosure provides a motor rotor, including a rotor core and a plurality of magnetic poles provided in the rotor core. The magnetic pole includes a first permanent magnet, a second permanent magnet, and a third permanent magnet, the first permanent magnet being arranged at the center position of the magnetic pole, the second permanent magnet being arranged at two sides of the first permanent magnet, the third permanent magnet being arranged at one side, away from the first permanent magnet, of the second permanent magnet. The coercivity of the first permanent magnet is less than the coercivity of the second permanent magnet and the coercivity of the third permanent magnet. The third permanent magnet is arranged on a q axis of a motor. The size relationship of the first permanent magnet, the second permanent magnet and the third permanent magnet in the cross section of the rotor core meets $m/2 > H1*Hcj1*L1/[(H2*Hcj2*L2+½H3*Hcj2*L3)] > m/10$, wherein m is a multiple of the motor flux adjustment range; L1 is the length of the first permanent magnet; H1 is the width of the first permanent magnet; Hcj1 is the intrinsic coercivity of the first permanent magnet; L2 is the length of the second permanent magnet; H2 is the width of the second permanent magnet; Hcj2 is the intrinsic coercivity of the second permanent magnet; L3 is the length of the third permanent magnet; H3 is the width of the third permanent magnet; and Hcj3 is the intrinsic coercivity of the third permanent magnet.

Preferably, the multiple m of the motor flux adjustment range is obtained according to the following formula:

$$\{[Br2*Hcj2*(2H2L2+H3L3)+Br1*Hcj1*H1L1]/[Br2*Hcj2*(2H2L2+H3L3)]\}*Br2*(2H2L2+H3L3)/[Br2*(2H2L2+H3L3)-Br1*H1L1]=m,$$

wherein Br1 is the remanence of the first permanent magnet, Br2 is the remanence of the second permanent magnet, and Br3 is the remanence of the third permanent magnet.

3. The motor rotor according to claim 1, wherein the width relation of the first permanent magnet, the second permanent magnet and the third permanent magnet satisfies that H1 is greater than 1.5H2 and less than 2H2, and/or, H1 is greater than 0.8H3 or equal to and less than or equal to H3.

Preferably, an included angle θ between a side edge, close to the first permanent magnet, of the second permanent magnet and a d axis of the motor satisfies that θ is greater than 10 degrees and less than 20 degrees.

Preferably, the motor rotor further includes a central rotating shaft. The rotor core further includes a central shaft hole. The central rotating shaft is arranged in the central shaft hole. A flux barrier slot is arranged at the radial inner side of the second permanent magnet and/or the third permanent magnet. When the central rotating shaft is a magnetic conductive shaft, a minimum distance L4 between the radial inner side edge of the flux barrier slot and the side wall of the central shaft hole satisfies that L4 is greater than 0.1L2 and less than 0.3L2. When the central rotating shaft is a non-magnetic-conductive shaft, the minimum distance L4 between the radial inner side edge of the flux barrier slot and the side wall of the central shaft hole satisfies that L4 is greater than 0.3L2 and less than 0.7L2.

Preferably, a cut slot extending from an outer circle of the rotor core to the radial outer side surface of the third permanent magnet is arranged at the radial outer side of the third permanent magnet, and the width L7 of the cut slot satisfies that L7 is greater than or equal to 0.5H3 and less than or equal to 0.8H3.

Preferably, in the cross section of the rotor core, a groove is formed on the outer circle of the rotor and located on the radial outer side of the third permanent magnet. An included angle between a connecting line of the vertex of the radial outer side, close to the d axis of the motor, of the groove and the center of the rotor core and the q axis of the motor, at which the third permanent magnet is positioned, is θ1, and a mechanical angle of the magnetic pole is θ2. θ1 is greater than 5 percent of θ2 and less than 10 percent of θ2.

Preferably, the flux barrier slot is arranged at one end, close to the q axis of the motor, of the second permanent magnet, and is located on the radial inner side of the third permanent magnet. A first flux bridge is formed between the third permanent magnet and the flux barrier slot, and a second flux bridge is formed between two adjacent flux barrier slots. A Y-shaped structure is formed by two first flux bridges and one second flux bridge.

Preferably, the radial width L5 of the first flux bridge is less than 0.7 mm; and/or, the relation between the circumferential width L6 of the second flux bridge and L5 satisfies that L6 is greater than or equal to L5 and less than or equal to 1.6L5.

According to another aspect of the present disclosure, a permanent magnet motor is provided, including a motor rotor. The motor rotor is the aforementioned motor rotor.

The motor rotor provided by the present disclosure includes a rotor core and a plurality of magnetic poles provided in the rotor core. The magnetic pole includes a first permanent magnet, a second permanent magnet, and a third permanent magnet, wherein the first permanent magnet is arranged at the center position of the magnetic pole, the second permanent magnet is arranged at the two sides of the first permanent magnet, and the third permanent magnet is arranged at one side, away from the first permanent magnet, of the second permanent magnet. The coercivity of the first permanent magnet is less than the coercivity of the second permanent magnet and the coercivity of the third permanent magnet. The third permanent magnets are arranged on the q axis of a motor. The size relationship of the first permanent magnet, the second permanent magnet and the third permanent magnet in the cross section of the rotor core meets $m/2 > H1*Hcj1*L1/[(H2*Hcj2*L2+\frac{1}{2}H3*Hcj2*L3)] > m/10$, wherein m is a multiple of the motor flux adjustment range; L1 is the length of the first permanent magnet; H1 is the width of the first permanent magnet; Hcj1 is the intrinsic coercivity of the first permanent magnet; L2 is the length of the second permanent magnet; H2 is the width of the second permanent magnet; Hcj2 is the intrinsic coercivity of the second permanent magnet; L3 is the length of the third permanent magnet; H3 is the width of the third permanent magnet; and Hcj3 is the intrinsic coercivity of the third permanent magnet. According to the motor rotor, when the motor operates, magnetic steel with relatively low coercivity is always operating in a flux intensifying state, so that no problem of flux change will occur. Since the first permanent magnet with relatively low coercivity is located at the center position of the corresponding magnetic pole, the magnetizing and demagnetizing difficulty of the motor can be reduced, and magnetizing and demagnetizing currents of the permanent magnets with relatively low coercivity are substantially reduced, and the magnetic stability during normal operation of the permanent magnets with low coercivity inside the rotor is improved. Since the third permanent magnets are arranged on the q axis of the motor, the reluctance on the q axis of the motor can be increased to ensure that the inductance Ld is greater than Lq and ensure that the operating efficiency of the motor is optimal under the flux intensifying state. The reasonable relation between the dimensions of the first permanent magnet, the second permanent magnet and the third permanent magnet and the flux adjustment range is defined, so that a relatively low magnetizing and demagnetizing current design can be guaranteed within the required flux adjustment range, and the operating efficiency of the motor is further improved.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

REFERENCE NUMERALS IN THE DRAWINGS

1: rotor core; 2: first permanent magnet; 3: second permanent magnet; 4: third permanent magnet; 5: central shaft hole; 6: central rotating shaft; 7: flux barrier slot; 8: cut slot; 9: groove; 10: first flux bridge; and 11: second flux bridge.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Referring to FIG. 1 to FIG. 4, according to the embodiments of the present disclosure, the motor rotor includes a rotor core 1 and a plurality of magnetic poles provided in the rotor core 1. The magnetic pole includes a first permanent magnet 2, a second permanent magnet 3, and a third permanent magnet 4, wherein the first permanent magnet 2 is arranged at the center position of the magnetic pole, the second permanent magnet 3 is arranged at two sides of the first permanent magnet 2, and the third permanent magnet 4 is arranged at one side, away from the first permanent magnet 2, of the second permanent magnet 3. The coercivity of the first permanent magnet 2 is less than the coercivity of the second permanent magnet 3 and the coercivity of the third permanent magnet 4. The third permanent magnets 4 are arranged on the q axis of the motor. The size relationship of the first permanent magnet 2, the second permanent magnet 3 and the third permanent magnet 4 in the cross section of the rotor core meets $m/2 > H1*Hcj1*L1/[(H2*Hcj2*L2+\frac{1}{2}H3*Hcj2*L3)] > m/10$, wherein m is a multiple of the motor flux adjustment range; L1 is the length of the first permanent magnet 2; H1 is the width of the first permanent magnet 2; Hcj1 is the intrinsic coercivity of the first permanent magnet 2; L2 is the length of the second permanent magnet 3; H2 is the width of the second permanent magnet 3; Hcj2 is the intrinsic coercivity of the second permanent magnet 3; L3 is the length of the third permanent magnet 4; H3 is the width of the third permanent magnet 4; and Hcj3 is the intrinsic coercivity of the third permanent magnet 4.

The motor rotor uses flux intensifying control in motor control logic, so that magnetic steel with relatively low coercivity is in a magnetic-keeping state in the whole operating process, and no problem of flux change will occur. Since the first permanent magnet 2 with relatively low coercivity is located at the center position of the corresponding magnetic pole, the magnetizing and demagnetizing difficulty of the motor can be reduced, and magnetizing and demagnetizing currents of the permanent magnets with relatively low coercivity are substantially reduced, and the controller cost is reduced. Since the third permanent magnets 4 are arranged on the q axis of the motor, the reluctance on the q axis of the motor can be increased to ensure that the inductance Ld is greater than Lq and ensure that the operating efficiency of the motor in the magnetizing state is highest. The reasonable relation between the dimensions of the first permanent magnet 2, the second permanent magnet 3 and the third permanent magnet 4 and the flux adjustment range is defined, so that a relatively low magnetizing and demagnetizing current design can be guaranteed within the required flux adjustment range, and the operating efficiency of the motor is further improved.

A variable-flux motor may have a defect of demagnetization of the permanent magnets with low coercivity under the influence of the control precision in a conventional driving process. Therefore, the motor adopts a magnetizing driving design. However, in order to guarantee the efficiency of the motor under flux intensifying control during normal operation of the motor, it is designed that Ld is greater than Lq, so that the permanent magnets of the pole are designed to be of a W-shaped structure. Furthermore, the third permanent magnets 4 with relatively high coercivity are arranged on the q axis to increase the reluctance on the q axis and ensure that the inductance Ld is greater than Lq and the operating efficiency of the motor in the magnetizing state is highest.

Preferably, the third permanent magnets 4 are symmetric about the q axis of the motor, at which the third permanent magnets 4 are positioned, so that the reluctance on the q axis in adjacent magnetic poles can be distributed uniformly, and then magnetic force lines in the motor are distributed uniformly, which effectively improves the operating efficiency and the operating stability of the motor.

Preferably, the first permanent magnets 2 are rectangular, and are arrayed linearly in the circumferential direction in the cross section of the rotor core 1. The first permanent magnet 2 is perpendicular to the d axis of the corresponding magnetic pole, so that the structural design of the first permanent magnets 2 is more reasonable, the volume occupation of the first permanent magnets 2 in a radial direction of the rotor is reduced, the number of the second permanent magnets 3 with relatively high coercivity is increased, and the torque and the power density of the motor are increased. Meanwhile, the magnetizing and demagnetizing currents of the motor during adjustment of a magnetic field is reduced more effectively, the magnetizing and demagnetizing difficulty of the motor is reduced, and real-time synchronous adjustment of the internal magnetic field of the motor is realized.

Preferably, the multiple m of the motor flux adjustment range is obtained according to the following formula:

$$\{[Br2*Hcj2*(2H2L2+H3L3)+Br1*Hcj1*H1L1]/[Br2*Hcj2*(2H2L2+H3L3)]\}*Br2*(2H2L2+H3L3)/[Br2*(2H2L2+H3L3)-Br1*H1L1]=m,$$

wherein Br1 is the remanence of the first permanent magnet 2, Br2 is the remanence of the second permanent magnet 3, and Br3 is the remanence of the third permanent magnet 4.

By the adoption of the above dimension constraint, the magnetizing and demagnetizing current can be effectively reduced, so that the cost of a control module can be effectively reduced.

Preferably, m is equal to 1.5, i.e., 0.75>H1*Hcj1*L1/[(H2*Hcj2*L2+½H3*Hcj2*L3)]>0.15. By such a design, the magnetizing and demagnetizing current is more reasonable. If no upper limit is set for the cost of the control module, according to a frequency modulation requirement of the solution, m may also be set as 5, and the size relationship range may be expanded to 2.5>H1*Hcj1*L1/[(H2*Hcj2*L2+½H3*Hcj2*L3)]>0.5, or even larger.

Figure 1:
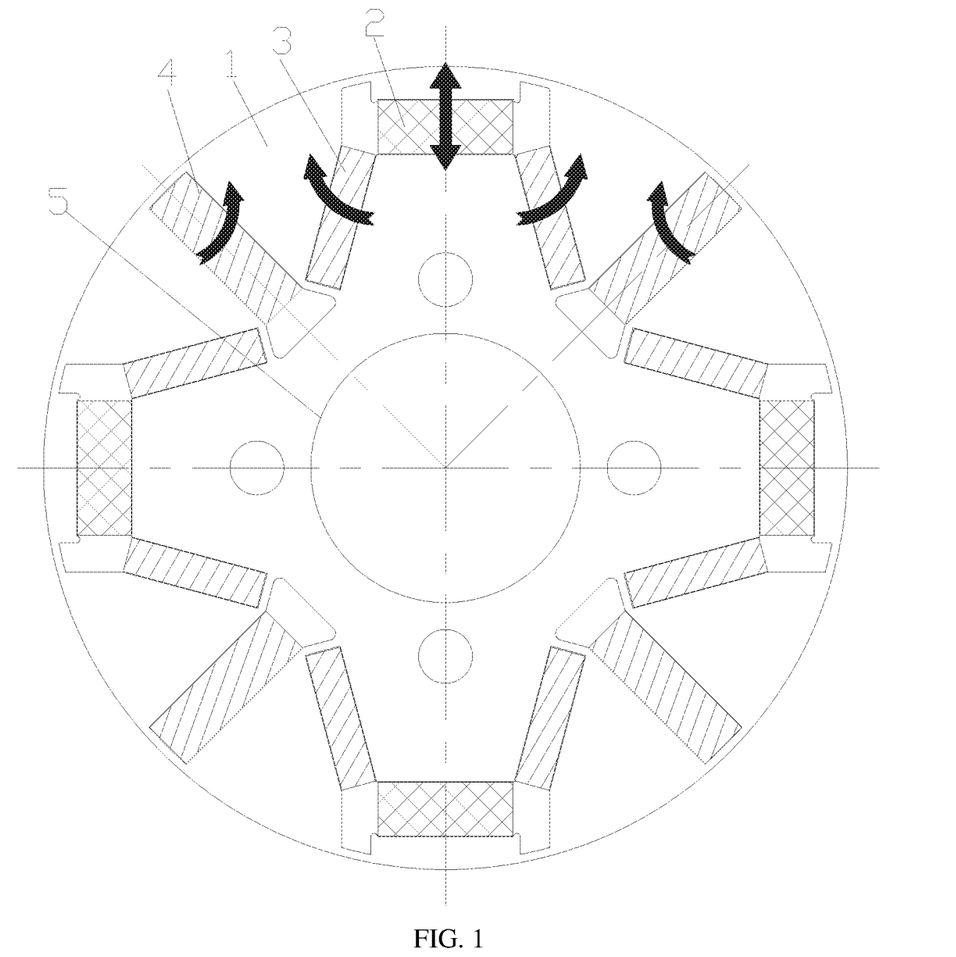
FIG. 1 is a schematic structural diagram of a motor rotor according to a first embodiment of the present disclosure.

Referring to FIG. 1, according to the first embodiment of the present disclosure, the width relation of the first permanent magnet 2, the second permanent magnet 3 and the third permanent magnet 4 in the cross section of the rotor core 1 satisfies that H1 is greater than 1.5H2 and less than 2H2, and/or, H1 is greater than or equal to 0.8H3 and less than or equal to H3. Therefore, the width of the second permanent magnet 3 and of the third permanent magnet 4 can have a good proportional relation with the width of the first permanent magnet 2 to ensure that the motor has good operating performance.

Preferably, an included angle θ between the edge of the side, close to the first permanent magnet 2, of the permanent magnet 3 and the d axis of the motor satisfies that θ is greater than 10 degrees and less than 20 degrees, thereby ensuring that the operating efficiency and torque pulsation of the motor can achieve the optimal effect.

Preferably, the motor rotor further includes a central rotating shaft 6. The rotor core 1 further includes a central shaft hole 5. The central rotating shaft 6 is arranged in the central shaft hole 5. A flux barrier slot 7 is arranged at the radial inner side of the second permanent magnet 3 and/or the third permanent magnet 4. When the central rotating shaft 6 is a magnetic conductive shaft, a minimum distance L4 between the radial inner side edge of the flux barrier slot 7 and the side wall of the central shaft hole 5 satisfies that L4 is greater than 0.1L2 and less than 0.3L2. When the central rotating shaft 6 is a non-magnetic-conductive shaft, the minimum distance L4 between the radial inner side edge of the flux barrier slot 7 and the side wall of the central shaft hole 5 satisfies that L4 is greater than 0.3L2 and less than 0.7L2.

A reasonable size relationship between the flux barrier slot 7 and the central shaft hole 5 may be designed according to different magnetic conductive performance of the central rotating shaft 6, thereby changing a magnetic circuit between two stages of the magnetic field of the motor and effectively changing the motor efficiency and the magnetizing and demagnetizing current magnitudes.

Figure 2:
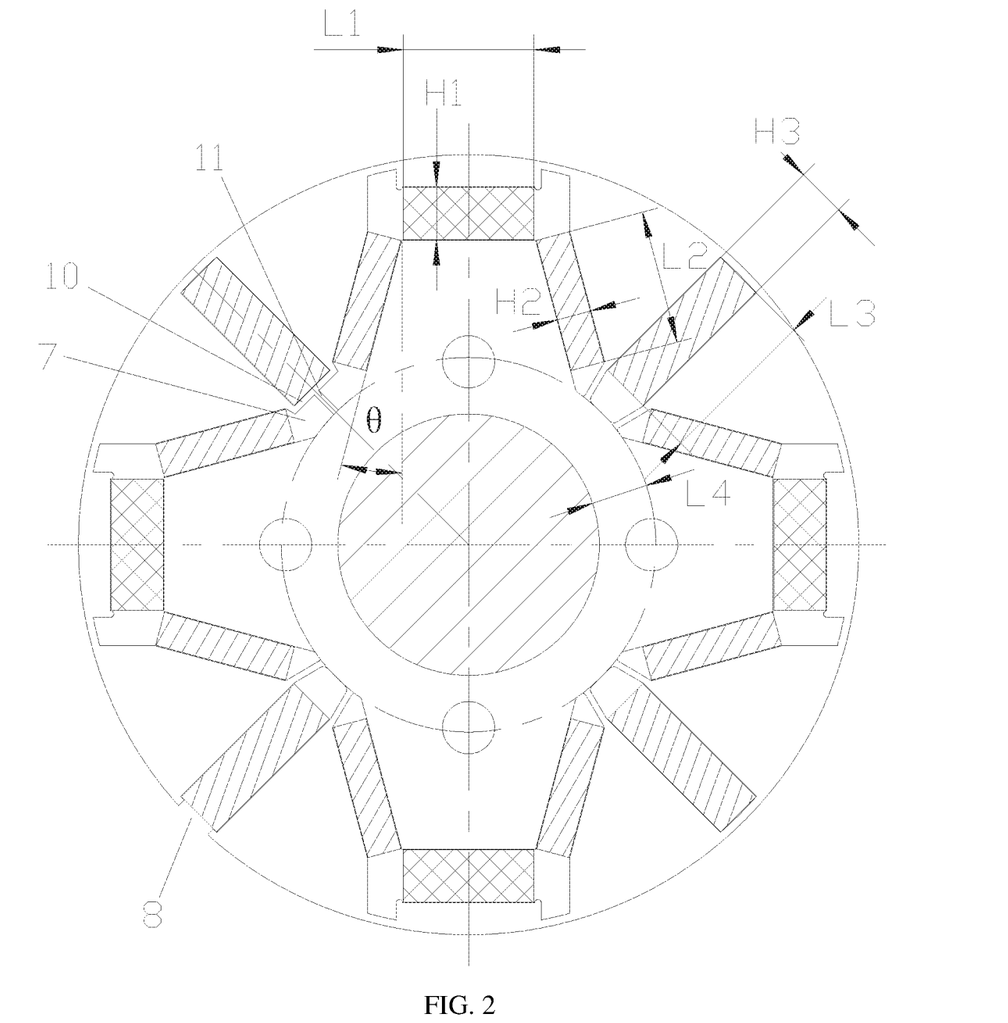
FIG. 2 is a first dimensional structural diagram of a motor rotor according to a second embodiment of the present disclosure.
Figure 3:
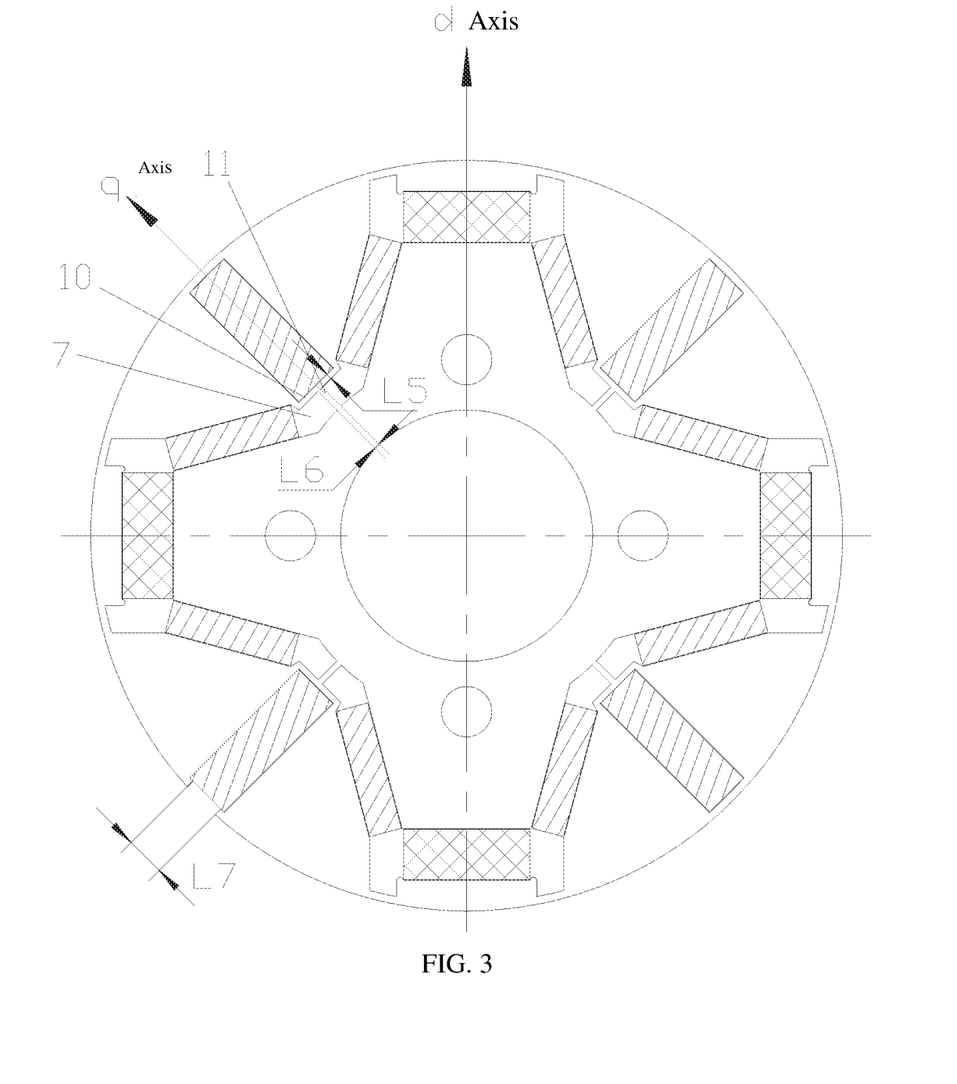
FIG. 3 is a second dimensional structural diagram of the motor rotor according to the second embodiment of the present disclosure.

Referring to FIG. 2 and FIG. 3 together, according to the second embodiment of the present disclosure, a cut slot 8 extending from an outer circle of the rotor core 1 to the radial outer side surface of the third permanent magnet 4 is arranged at the radial outer side of the third permanent magnet 4, and the width L7 of the cut slot 8 satisfies that L7 is greater than or equal to 0.5H3 and less than or equal to 0.8H3. By slotting the portion, located on the radial outer side of the third permanent magnet 4, of the iron core and designing reasonable slotting dimensions, flux leakage from the end portions of the tangential permanent magnets can be reduced, and the reluctance on the q axis is further increased. Since the width L7 of the cut slot 8 is less than the width H3 of the third permanent magnet 4, it can still be ensured that the third permanent magnet 4 is stably maintained in the rotor core 1 and prevented from falling off from the corresponding cut slot 8.

Preferably, the flux barrier slot 7 is arranged at one end, close to the q axis of the motor, of the second permanent magnet 3, and is located on the radial inner side of the third permanent magnet 4. A first flux bridge 10 is formed between the third permanent magnet 4 and the flux barrier slot 7, and a second flux bridge 11 is formed between two adjacent flux barrier slots 7. A Y-shaped structure is formed by two first flux bridges 10 and one second flux bridge 11. The flux bridges are designed between the second permanent magnet 3 and the third permanent magnet 4, so that the internal structural strength of the rotor core 1 can be enhanced. However, the flux bridges can aggravate the flux leakage of the permanent magnets, so that the structures of the flux bridges need to be optimized. By designing the flux bridges between the third permanent magnet 4 and the second permanent magnets 3 on two sides of the third permanent magnet 4 as the Y-shaped flux bridge structure, the flux leakage of the permanent magnets can be effectively reduced, and the working performance of the motor is improved.

Preferably, the radial width L5 of the first flux bridge 10 is less than 0.7 mm; and/or, the relation between the circumferential width L6 of the second flux bridge 11 and L5 satisfies that L6 is greater than or equal to L5 and less than or equal to 1.6L5.

Figure 4:
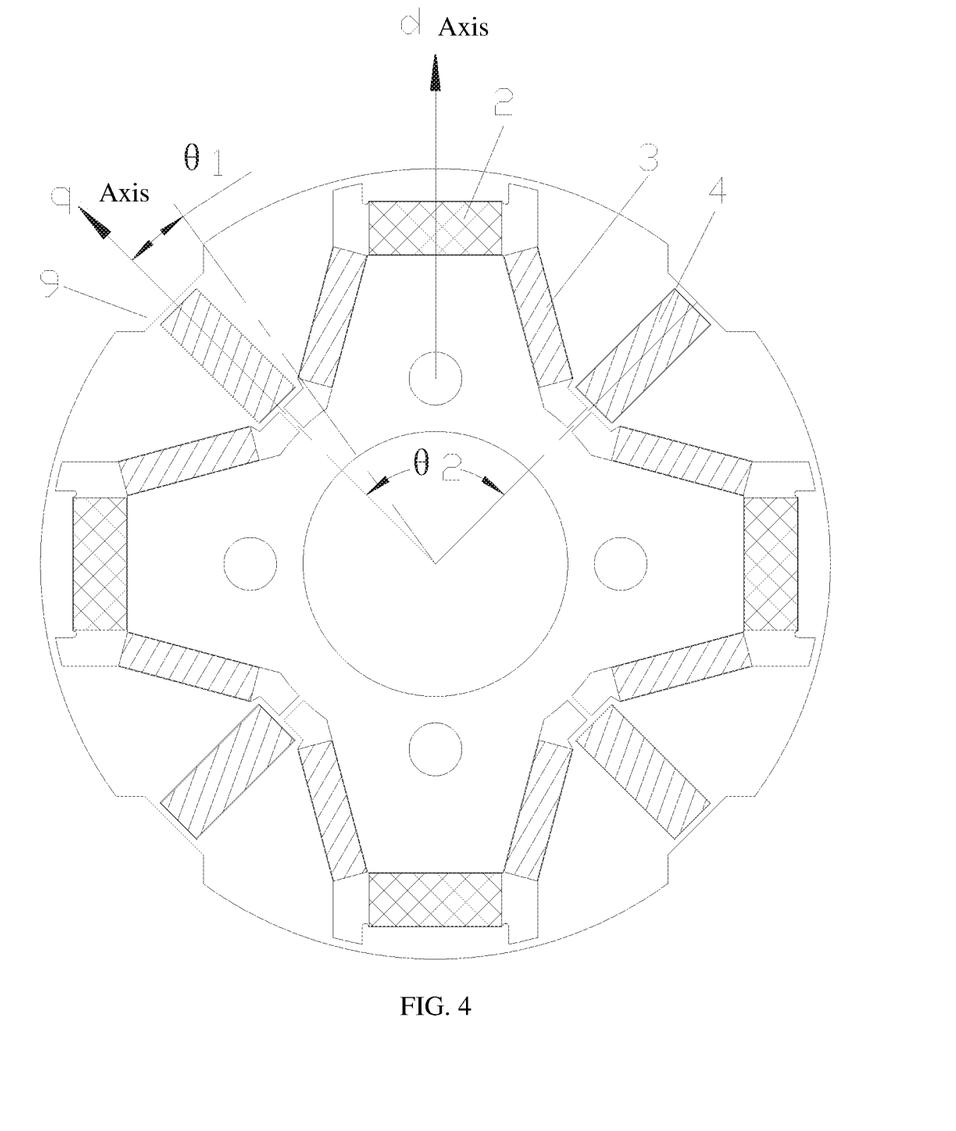
FIG. 4 is a dimensional structural diagram of a motor rotor according to a third embodiment of the present disclosure.

Referring to FIG. 4, according to the third embodiment of the present disclosure, this embodiment is basically the same as the second embodiment. A difference is that in the present embodiment, cut slots 8 are not designed any more, but a groove 9 is formed on the outer circle of the rotor and located on the radial outer side of the third permanent magnet 4. An included angle between a connecting line of the vertex of the radial outer side, close to the d axis of the motor, of the groove 9 and the center of the rotor core 1 and the q axis of the motor, at which the third permanent magnet 4 is positioned, is θ1, and a mechanical angle of the magnetic pole is θ2. θ1 is greater than 5 percent of θ2 and less than 10 percent of θ2. A flux bridge structure is formed between the bottom of the groove 9 and the radial outer side edge of the third permanent magnet 4.

By limiting the grooving angles of the grooves 9, the reluctance on the q axis can be further increased, and the reluctance torque is increased, without affecting a main magnetic circuit, thereby guaranteeing the motor efficiency.

According to the embodiment of the present disclosure, a permanent magnet motor includes a motor rotor. The motor rotor is the aforementioned motor rotor.

It can be easily understood by those skilled in the art that the above-mentioned advantageous methods can be freely combined and superimposed if not conflicted.

The above is only the preferred embodiments of the present disclosure, and is not intended to limit the present disclosure. Any modifications, equivalent replacements and improvements that are made within the spirit and principle of the present disclosure shall fall into the protection scope of the present disclosure. The above is only the preferred implementation modes of the present disclosure. It should be noted that a person of ordinary skill in the art can further make various improvements and variants without departing from the technical principles of the present disclosure. These improvements and variants shall all fall into the protection scope of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A motor rotor, comprising:
   a rotor core and
   a plurality of magnetic poles provided in the rotor core, wherein the magnetic pole comprises:
   a first permanent magnet,
   a second permanent magnet, and
   a third permanent magnet, the first permanent magnet being arranged at the central position of the corresponding magnetic pole, the second permanent magnet being arranged at two sides of the corresponding first permanent magnet, the third permanent magnet being arranged at one side, away from the first permanent magnet, of the corresponding second permanent magnet,
   wherein the coercivity of the first permanent magnet is less than the coercivity of the second permanent magnet and the coercivity of the third permanent magnet;
   the third permanent magnet is arranged on a q axis of a motor; and
   the size relationship of the first permanent magnet, the second permanent magnet and the third permanent magnet in the cross section of the rotor core meets $m/2 > H1*Hcj1*L1/[(H2*Hcj2*L2 + \frac{1}{2}H3*Hcj2*L3)] > m/10$, wherein
   m is a multiple of the motor flux adjustment range; L1 is the length of the first permanent magnet; H1 is the width of the first permanent magnet; Hcj1 is the intrinsic coercivity of the first permanent magnet; L2 is the length of the second permanent magnet; H2 is the width of the second permanent magnet; Hcj2 is the intrinsic coercivity of the second permanent magnet; L3 is the length of the third permanent magnet; H3 is the width of the third permanent magnet; and Hcj3 is the intrinsic coercivity of the third permanent magnet.

2. The motor rotor according to claim 1, wherein the multiple m of the motor flux adjustment range is obtained according to the following formula:

$$\{[Br2*Hcj2*(2H2L2+H3L3)+Br1*Hcj1*H1L1]/[Br2*Hcj2*(2H2L2+H3L3)]\}*Br2*(2H2L2+H3L3)/[Br2*(2H2L2+H3L3)-Br1*H1L1] = m,$$

wherein Br1 is the remanence of the first permanent magnet, Br2 is the remanence of the second permanent magnet, and Br3 is the remanence of the third permanent magnet.

3. The motor rotor according to claim 2, wherein a flux barrier slot is arranged at one end, close to the q axis of the motor, of the second permanent magnet, and is located on the radial inner side of the third permanent magnet; a first flux bridge is formed between the third permanent magnet and the flux barrier slot, and a second flux bridge is formed between two adjacent flux barrier slots; and a Y-shaped structure is formed by two first flux bridges and one second flux bridge.

4. The motor rotor according to claim 1, wherein the width relation of the first permanent magnet, the second permanent magnet and the third permanent magnet satisfies that H1 is greater than 1.5H2 and less than 2H2, and/or, H1 is greater than or equal to 0.8H3 and less than or equal to H3.

5. The motor rotor according to claim 4, wherein a flux barrier slot is arranged at one end, close to the q axis of the motor, of the second permanent magnet, and is located on the radial inner side of the third permanent magnet; a first flux bridge is formed between the third permanent magnet and the flux barrier slot, and a second flux bridge is formed between two adjacent flux barrier slots; and a Y-shaped structure is formed by two first flux bridges and one second flux bridge.

6. The motor rotor according to claim 1, wherein an included angle θ between a side edge, close to the first permanent magnet, of the second permanent magnet and a d axis of the motor satisfies that θ is greater than 10 degrees and less than 20 degrees.

7. The motor rotor according to claim 6, wherein a flux barrier slot is arranged at one end, close to the q axis of the motor, of the second permanent magnet, and is located on the radial inner side of the third permanent magnet; a first flux bridge is formed between the third permanent magnet and the flux barrier slot, and a second flux bridge is formed between two adjacent flux barrier slots; and a Y-shaped structure is formed by two first flux bridges and one second flux bridge.

8. The motor rotor according to claim 1, wherein the motor rotor further comprises a central rotating shaft, the rotor core further comprises a central shaft hole, and the central rotating shaft is arranged in the central shaft hole; a flux barrier slot is arranged at the radial inner side of the second permanent magnet and/or the radial inner side of the third permanent magnet; when the central rotating shaft is a magnetic conductive shaft, a minimum distance L4 between the radial inner side edge of the flux barrier slot and the side wall of the central shaft hole satisfies that L4 is greater than 0.1L2 and less than 0.3L2; and when the central rotating shaft is a non-magnetic-conductive shaft, the minimum distance L4 between the radial inner side edge of the flux barrier slot and the side wall of the central shaft hole satisfies that L4 is greater than 0.3L2 and less than 0.7L2.

9. The motor rotor according to claim 8, wherein a flux barrier slot is arranged at one end, close to the q axis of the motor, of the second permanent magnet, and is located on the radial inner side of the third permanent magnet; a first flux bridge is formed between the third permanent magnet and the flux barrier slot, and a second flux bridge is formed between two adjacent flux barrier slots; and a Y-shaped structure is formed by two first flux bridges and one second flux bridge.

10. The motor rotor according to claim 1, wherein a cut slot extending from an outer circle of the rotor core to the radial outer side surface of the third permanent magnet is arranged at the radial outer side of the third permanent magnet (4), and the width L7 of the cut slot (8) satisfies that L7 is greater than or equal to 0.5H3 and less than or equal to 0.8H3.

11. The motor rotor according to claim 10, wherein a flux barrier slot is arranged at one end, close to the q axis of the motor, of the second permanent magnet, and is located on the radial inner side of the third permanent magnet; a first flux bridge is formed between the third permanent magnet and the flux barrier slot, and a second flux bridge is formed between two adjacent flux barrier slots; and a Y-shaped structure is formed by two first flux bridges and one second flux bridge.

12. The motor rotor according to claim 1, wherein in the cross section of the rotor core, a groove is formed on the outer circle of the rotor and located on the radial outer side of the third permanent magnet; an included angle between a connecting line of the vertex of the radial outer side, close to the d axis of the motor, of the groove and the center of the rotor core and the q axis of the motor, at which the third permanent magnet is positioned, is θ1, and a mechanical angle of the magnetic pole is θ2; and θ1 is greater than 5 percent of θ2 and less than 10 percent of θ2.

13. The motor rotor according to claim 12, wherein a flux barrier slot is arranged at one end, close to the q axis of the motor, of the second permanent magnet, and is located on the radial inner side of the third permanent magnet; a first flux bridge is formed between the third V permanent magnet and the flux barrier slot, and a second flux bridge is formed between two adjacent flux barrier slots; and a Y-shaped structure is formed by two first flux bridges and one second flux bridge.

14. The motor rotor according to claim 1, wherein a flux barrier slot is arranged at one end, close to the q axis of the motor, of the second permanent magnet, and is located on the radial inner side of the third permanent magnet; a first flux bridge is formed between the third permanent magnet and the flux barrier slot, and a second flux bridge is formed between two adjacent flux barrier slots; and a Y-shaped structure is formed by two first flux bridges and one second flux bridge.

15. The motor rotor according to claim 14, wherein the radial width L5 of the first flux bridge is less than 0.7 mm; and/or, the relation between the circumferential width L6 of the second flux bridge and L5 satisfies that L6 is greater than or equal to L5 and less than or equal to 1.6L5.

16. A permanent magnet motor, comprising a motor rotor, wherein the motor rotor is the motor rotor according to claim 1.

17. The permanent magnet motor according to claim 16, wherein the multiple m of the motor flux adjustment range is obtained according to the following formula:

$$\{[Br2*Hcj2*(2H2L2+H3L3)+Br1*Hcj1*H1L1]/[Br2*Hcj2*(2H2L2+H3L3)]\}*Br2*(2H2L2+H3L3)/[Br2*(2H2L2+H3L3)-Br1*H1L1]=m,$$

wherein Br1 is the remanence of the first permanent magnet, Br2 is the remanence of the second permanent magnet, and Br3 is the remanence of the third permanent magnet.

18. The permanent magnet motor according to claim 16, wherein the width relation of the first permanent magnet, the second permanent magnet and the third permanent magnet satisfies that H1 is greater than 1.5H2 and less than 2H2, and/or, H1 is greater than or equal to 0.8H3 and less than or equal to H3.

19. The permanent magnet motor according to claim 16, wherein an included angle θ between a side edge, close to the first permanent magnet, of the second permanent magnet and a d axis of the motor satisfies that θ is greater than 10 degrees and less than 20 degrees.

20. The permanent magnet motor according to claim 16, wherein the motor rotor further comprises a central rotating shaft, the rotor core further comprises a central shaft hole, and the central rotating shaft is arranged in the central shaft hole; a flux barrier slot is arranged at the radial inner side of the second permanent magnet and/or the radial inner side of the third permanent magnet; when the central rotating shaft is a magnetic conductive shaft, a minimum distance L4 between the radial inner side edge of the flux barrier slot and the side wall of the central shaft hole satisfies that L4 is greater than 0.1L2 and less than 0.3L2; and when the central rotating shaft is a non-magnetic-conductive shaft, the minimum distance L4 between the radial inner side edge of the flux barrier slot and the side wall of the central shaft hole satisfies that L4 is greater than 0.3L2 and less than 0.7L2.

\* \* \* \* \*